United States Patent [19]

Needham

[11] 4,176,098

[45] Nov. 27, 1979

[54] ARC RESISTANT COMPOSITION

[75] Inventor: Donald G. Needham, Ramona, Okla.

[73] Assignee: Phillips Petroleum Company, Bartlesville, Okla.

[21] Appl. No.: 914,837

[22] Filed: Jun. 12, 1978

Related U.S. Application Data

[63] Continuation-in-part of Ser. No. 837,651, Sep. 30, 1977, abandoned, which is a continuation-in-part of Ser. No. 701,728, Jul. 1, 1976, abandoned.

[51] Int. Cl.$^2$ .............................................. C08L 81/04
[52] U.S. Cl. .................................. 260/18 R; 252/63.2; 260/37 R
[58] Field of Search ........................... 260/37 R, 18 R; 252/63.2

[56] References Cited

U.S. PATENT DOCUMENTS

| | | | |
|---|---|---|---|
| 3,157,614 | 11/1964 | Fischer | 260/42.46 |
| 3,354,129 | 11/1967 | Edmonds | 260/79 |
| 3,562,199 | 2/1971 | Hill | 260/37 |
| 3,929,708 | 12/1975 | Brady et al. | 260/29.1 SB |

*Primary Examiner*—James H. Derrington

[57] ABSTRACT

An arc resistant composition is produced by incorporating into poly(arylene sulfide) about 30–70 percent by weight of fillers including 20–50 percent by weight of the total composition of at least one of clay and talc. Glass, calcium carbonate, lithium carbonate, and zinc stearate can also be present in the composition to improve physical properties and processing. Addition of small quantities of silanes to the arc resistant composition improves its water resistance and linear coefficient of expansion without impairing its arc resistance or physical properties. Electrical components which must be arc resistant and low wattage resistance heater housings can be produced from the compositions made in accordance with this invention.

20 Claims, No Drawings

ARC RESISTANT COMPOSITION

This application is a continuation-in-part of my co-pending application having Ser. No. 837,651 filed Sept. 30, 1977, now abandoned which is a continuation-in-part of Ser. No. 701,728 filed July 1, 1976 now abandoned.

BACKGROUND OF THE INVENTION

This invention relates to arc resistant compositions. In particular, it relates to arc resistant compositions having poly(arylene sulfide) as their basic ingredient.

In many commercial applications involving the use of high-voltage electric current, such as electric power transmission, or electric resistance heating, it is either necessary or desirable to employ components made of materials which are arc resistant as defined in ASTM-D-495-73. Even more desirable are arc resistant compositions which are water resistant and which have acceptable physical properties.

The present invention provides an arc resistant composition which is suitable for being made into electrical components.

It is therefore one object of the invention to provide an arc resistant composition of matter and a process for making same.

Another object of the invention is to provide an arc resistant composition which possesses acceptable physical properties.

A further object of the invention is to provide an arc resistant composition which is water resistant.

Still another object of the invention is to provide an arc resistant composition which has an improved linear coefficient of expansion.

A still further object of the invention is to provide articles made of the arc resistant composition.

Still another object of the invention is to provide an arc resistant article having acceptable physical properties and improved water resistance and linear coefficient of expansion.

SUMMARY OF THE INVENTION

In accordance with one aspect of the invention, an arc resistant composition comprises poly(arylene sulfide) and an amount of from about 20 to about 50 percent by weight of the total composition of at least one of clay or talc which is sufficient to render the composition arc resistant. Further, in accordance with this invention an arc resistant composition comprises 30-70 percent by weight of the total composition of fillers including at least one of clay and talc.

In accordance with another aspect of the invention, the arc resistant composition comprising poly(arylene sulfide) and clay or talc filler can also comprise as filler from 0-35 percent by weight glass and/or from 0-40 percent by weight calcium carbonate or from about 0-5 weight percent lithium carbonate (weight percents based on total weight of the composition) within the 30-70 percent by weight range of total filler. The upper limit of 70 percent by weight filler encompasses embodiments in which lithium carbonate, glass and talc and/or clay fillers are used together, although it is currently contemplated that a combination of fillers using calcium carbonate, glass and talc and/or clay would fall within a range of total filler of 30-60 percent by weight, as set out in Ser. No. 837,651 filed Sept. 30, 1977 now abandoned. The use of glass increases the tensile strength of the composition.

In accordance with another aspect of the invention, an arc resistant composition having improved water resistance is provided. The composition comprises poly(phenylene sulfide), 30-70 percent by weight of fillers comprising at least one of clay or talc and about 0.5-5 weight percent of silanes all based on total weight of the composition.

In accordance with a further aspect of the invention, a method for producing an arc resistant composition is provided. Uncured or partially cured poly(phenylene sulfide) is placed in a suitable blender together with 30-70 weight percent of fillers comprising 0-35 weight percent of glass, 0-40 weight percent of calcium carbonate, 0-5 weight percent lithium carbonate, and at least one of clay and talc. The ingredients are mixed until a homogeneous blend is produced. The blend is then injection molded to form an arc resistant composition.

In accordance with still another aspect of the invention, a method for producing an arc resistant composition which has improved water resistance is provided. Uncured or partially cured poly(phenylene sulfide) is blended in a tumbler together with about 30-70 percent by weight of fillers comprising 0-35 weight percent of glass, 0-40 weight percent of calcium carbonate, 0-5 weight percent lithium carbonate, about 0.5-5 weight percent of silanes, and a remainder including at least one of talc and clay. The blend is then compression molded to form an arc resistant composition of desired shape.

In accordance with still another aspect of the invention, an article of manufacture is produced using the composition of this invention.

Further aspects of the invention will become apparent to those skilled in the art upon study of this specification and the appended claims.

DETAILED DESCRIPTION OF THE INVENTION

Poly(arylene sulfides) having no additives do not exhibit good arc resistance properties. For example, poly(phenylene sulfide) has arc resistance of about 10 seconds, measured in accordance with ASTM-D-495-73, whereas the minimum acceptable value for arc resistant materials is about 120 seconds.

Surprisingly, it was discovered that addition of large amounts of fillers comprising from about 30-70 percent by weight of the total composition with about 20-50 percent by weight of the total composition being at least one of clay and talc to poly(arylene sulfide) produces a composition which is arc resistant, i.e., has arc resistance equal to or greater than 120 seconds as measured by ASTM-D-495-73. Moreover, it was discovered that addition of small amounts of silanes to the new arc resistant composition imparts improved water resistance to the composition and decreases, or at least stabilizes, its linear coefficient of expansion.

Any uncured or partially cured poly(arylene sulfide), whether homopolymer, copolymer, terpolymer, and the like, or a blend of such polymers, can be used in the practice of this invention. In this application an uncured or partially cured polymer is a polymer the molecular weight of which can be increased by either lengthening of a molecular chain or by cross-linking or by combination of both by supplying thereto sufficient energy, such as heat, preferably in the presence of oxygen. The process which increases the molecular weight of the polymer shall be designated as a curing process. Particularly suited for use in this invention are those poly(arylene sulfides) having inherent viscosities in chloronaphthalene (0.2 gram polymer in 100 cc chloronaphthalene) at 206° C. (402.8° F.) of at least about 0.08, preferably between about 0.1 and about 0.3, and more preferably about 0.13 and 0.23. Examples of polymers which can be used in this invention are disclosed in U.S. Pat. No. 3,354,129. Other examples of poly(arylene sulfides) are poly(4,4'-biphenylene sulfide); poly(2,4-tolylene sulfide); a copolymer from p-dichlorobenzene, 2,4-dichlorotoluene, and solium sulfide, and blends thereof. Of all of the poly(arylene sulfides), poly(phenylene sulfide) (PPS) polymers are presently preferred for use with the invention.

Any commercially available clay, talc, calcium carbonate, or glass can be used as fillers; high purity of these ingredients is not required.

Although it is believed that any silane can be utilized to impart improved water resistance and linear coefficient of expansion to the new arc resistant composition, presently preferred are the alkylsilanes, alkoxysilanes, and polymers thereof. Examples of these are: γ-glycidoxypropyltrimethoxysilane, methyltrimethoxysilane, and polyisoxymethoxysilane.

It has also been found that zinc stearate added to the compositions of this invention acts as a processing aid. Zinc stearate is effective, if present, in amounts up to about 0.5 weight percent of the total composition, preferably in the range of up to 0.3 weight percent.

The proportion of fillers added to poly(arylene sulfide) can vary from about 30 to about 70 weight percent of the total composition when lithium carbonate is among the fillers used, but when calcium carbonate is the only carbonate present the range of total fillers is about 30 to about 60 weight percent. The fillers comprise 0–35 weight percent of glass, 0–40 weight percent of calcium carbonate, 0–5 weight percent lithium carbonate, and the remainder at least one of talc and clay. One presently preferred arc resistant composition comprises:

PPS: 45 weight percent
Clay: 17.5 weight percent
Talc: 17.5 weight percent
Glass: 20.0 weight percent The concentration of silanes that can optionally be incorporated into the improved arc resistant composition can vary between about 0.5 and about 5 weight percent, usually between about 0.5 and about 1 weight percent of the total composition.

The method for producing the improved arc resistant composition is best explained by following in sequence the steps of the process.

If the composition is made for injection molding, it is desirable to partially cure the polymer to reduce its melt flow to a value below 1000 g/10 minutes according to ASTM Method D-1238-74 (343° C. and 5 kg load). The composition made from polymers having melt flow below that level can be injection molded with greater efficiency. The curing process is accomplished by subjecting the uncured or partially cured polymer, preferably in air, to elevated temperatures until desired melt flow is obtained. Elevated temperatures of at least 450° F. (232° C.) are normally used; the preferred temperature ranges from 550°–900° F. (288°–482° C.).

The uncured or partially cured polymer is placed in a blender or other suitable mixer together with preselected amounts of a filler or fillers, and, optionally, a predetermined amount of silanes. The ingredients are then extrusion compounded in accordance with known processes to produce a homogeneous blend.

The compounded blend is then introduced into an injection molding apparatus to form, upon processing, an arc resistant composition. The product of the injection molding step can be shaped to a desired form during injection molding or it can be machine- or otherwise-shaped after the injection molding step is completed.

When the composition is not produced for injection molding, but instead by a process such as compression molding, the melt flow characteristics of the poly(arylene sulfide) are normally not as important. Any solid or liquid, uncured or partially cured poly(arylene sulfide) can be blended with the enumerated fillers and the composition cured by application of energy such as heat without first bringing the melt flow of the poly(arylene sulfide) to a preferred minimum level.

The following examples are provided merely to illustrate the practice of the invention rather than to in any way limit the scope of the invention.

EXAMPLE I

Powder poly(phenylene sulfides), known under the trademark Ryton® P3 and all having a density of 1.3 measured in accordance with ASTM-D-1505-68 and a melt flow of 75 g/10 minutes measured in accordance with ASTM-D-1238-74, (343° C. and 5 kg load) was blended with varying amounts of clay, talc, calcium carbonate, mica, and fiberglass. The weight percentage of each filler in each one of the blends is shown in Table I. The blending was performed by tumbling the ingredients of each sample in a rotating drum blender or blending in a Henschel mixer and then extruding.

Each of the blends and a batch of pure poly(phenylene sulfide) of the type used for making the blends were injection molded into bar specimens having dimensions (8.5 inch × ½ inch × 125 mils) and shape suitable for ASTM tensile strength. Each specimen was then tested to determine its tensile strength, % elongation, arc resistance (in accordance with ASTM-D-495-73). The results are shown in Table I.

TABLE I

| | ARC RESISTANT PPS | | | | | | | | | Control[8] Ryton* R6 Poly |
|---|---|---|---|---|---|---|---|---|---|---|
| Blend | A | B | C | D | E | F | G | H | I | (phenylene sulfide) |
| Component, wt. % of total blend | | | | | | | | | | |
| Ryton*P-3 Poly-(phenylene sulfide) | 60% | 60% | 60% | 60% | 60% | 60% | 60% | 60% | 45% | 100 |
| Clay[1] | 40% | — | — | — | — | 20% | — | 20% | 17.5% | |
| Talc[2] | — | 40% | — | — | — | 20% | 20% | — | 17.5% | |
| Calcium Carbonate[3] | — | — | 40% | — | — | — | 20% | 20% | — | |

TABLE I-continued
ARC RESISTANT PPS

| Blend | A | B | C | D | E | F | G | H | I | Control[8] Ryton* R6 Poly (phenylene sulfide) |
|---|---|---|---|---|---|---|---|---|---|---|
| Mica[4] | — | — | — | 40% | — | — | — | — | — | |
| Fiberglass[5] | — | — | — | — | 40% | — | — | — | 20% | |
| Tensile, psi[7] | 9,600 | 10,400 | 8,025 | 8,750 | 18,200 | 10,300 | 9,450 | 7,750 | 14,300 | 10,800 |
| Tensile, kPa | 66,240 | 71,760 | 55,373 | 60,375 | 125,580 | 71,070 | 65,205 | 53,475 | 98,670 | |
| % Elongation | 1.04 | 0.8 | 1.02 | 0.54 | 1.08 | 0.88 | 1.12 | 0.83 | 0.1 | 3.0 |
| Arc Resistance (seconds) | 181 | 178 | 47 | 17 | 24 | 182 | 130 | 133 | 180 | 10.8 |
| Izod Impact[9] 75° F. | | (6) | (6) | (6) | | (6) | (6) | | | |
| Unnotched ⅛" ft. lbs./in. | 2.20 | 1.93 | Not run | Not run | Not run | 2.94 | Not run | Not run | 2.2 | 3.0 |
| Unnotched, N.m/m, | 117.4, | 103.0, | | | | 156.9, | | | 117.4 | 160.1 |
| Notched ⅛" ft. lbs./in. | 0.27 | 0.29 | 0.21 | 0.36 | 1.38 | 0.24 | 0.25 | 0.20 | 0.45 | 0.2 |
| Notched, N.m/m, | 14.4, | 15.5, | 11.2, (6) | 19.2, (6) | 73.65, | 12.8, | 13.34, | 10.67, | 24.0, | 10.67 |
| Spiral Flow (inches) | 27 | 22 | Not run | Not run | 17 | 26 | 20 | 22 | | |
| Spiral Flow (cm) | 69 | 56 | | | 43 | 66 | 10.51 | 56 | | |

[1]Huber #200L
[2]Desert mineral #57
[3]Georgia marble #10
[4]Marietta suzorite 20–40 mesh
[5]Owens Corning #497
[6]Some properties not determined due to Low ARC Resistance, minimum ARC Resistance for this resin is 120 seconds.
[7]Minimum Tensile Strength desired is 10,000 psi (69,00 × 10³ Pa)
[8]Ryton*R-6 is the pelletized Ryton P-3 (powder).
[9]ASTM D-256.
*Phillips Petroleum Co. Trademark The results indicate that addition of the enumerated fillers alters the tensile strength of poly(phenylene sulfide) and the % elongation. However, each one of the fillers improved the arc resistance of the polymer. The degree to which the arc resistance was improved varied greatly depending on the amount and type of the filler. The best arc resistance was obtained with blends A, B, F, and I. Considerably less improvement in arc resistance was observed with blends G and H. Other blends specified in Table I resulted in only slight improvement of arc resistance, not sufficient to satisfy the minimum 120 second arc resistance as measured by ASTM-D-495-73.

It should be noted that blend I composed of 17% of clay, 17% of talc, and 20% of fiberglass resulted in a composition having not only vastly improved arc resistance but also having tensile strength reduced least of any of the other compositions formed through compounding poly(phenylene sulfide).

EXAMPLE II

Since talc and clay in combination with poly(phenylene sulfide) appeared to have good arc resistance, another series of tests was made using varying amounts of these two fillers. The tests were conducted by procedures outlined in Example I. The results are summarized below.

TABLE II

| Filler, Wt. % | | Arc Resistance, seconds | Melt Flow[1] g/10 minutes |
|---|---|---|---|
| Talc | Clay | | |
| 10 | 10 | 132 | 93.6 |
| 15 | 15 | 183 | 68.1 |
| 20 | 20 | 188 | 37.4 |
| 25 | 25 | 193 | 10.7 |

[1]ASTM D-1238-74, 343° C. and 5 kg load

The data show that all the blends exceed the minimum accepted value for arc resistance of 120 seconds but that the blends containing 15 wt. % of each filler have by far superior combined properties of arc resistance and melt flow. Good melt flow properties are required for good processability of the composition especially by injection molding.

EXAMPLE III

A blend of the following ingredients at specified concentrations was produced by mixing in a blender with subsequent extrusion:

| Ingredient | Concentration (wt. %) |
|---|---|
| Partially cured poly(phenylene sulfide) | 45 |
| Clay | 17.5 |
| Talc | 17.5 |
| Glass | 20.0 |

The blend was then subdivided into seven samples. Six of the samples were compounded with 0.8 weight percent of various silanes as follows:
Sample 1: Control, no silane
Sample 2: γ-glycidoxypropyltrimethoxysilane (Union Carbide)
Sample 3: γ-glycidoxypropyltrimethoxysilane (Dow)
Sample 4: methyltrimethoxysilane (Dow)
Sample 5: polyisoxymethoxysilane (Dow)
Sample 6: methylmethoxysilane (Union Carbide)
Sample 7: long chain alkyl silane (Experimental) (Dow)

The samples were injection molded to produce specimens of a shape suitable for testing. The physical and electrical properties and coefficients of linear thermal expansion of each specimen were then tested. The results of the tests appear in Tables III-V.

TABLE III

| Property | Tensile Strength[1] psi (kg/cm²) | Flex Mod. × 10³[2] psi (kg/cm²) | Unnotched Izod[3] Ft. lbs/in (cm kg/cm) | Notched Izod[3] Ft. lbs/in (cm kg/cm) |
|---|---|---|---|---|
| Sample 1 | 13,325 (932.75) | 1,673.7 (117.16) | 2.9 (15.77) | 0.55 (2.99) |
| 2 | 13,875 (967.75) | 1,641.0 (114.87) | 2.7 (14.68) | 0.53 (2.88) |
| 3 | 13,150 (920.50) | 1,712.1 (119.85) | 2.8 (15.23) | 0.57 (3.1) |
| 4 | 12,975 (908.25) | 1,733.3 (121.33) | 2.4 (13.05) | 0.60 (3.26) |
| 5 | 14,475 (1013.25) | 1,764.1 (123.49) | 2.7 (14.68) | 0.48 (2.61) |
| 6 | 14,000 (980.0) | 1,723.0 (120.61) | 3.0 (16.31) | 0.53 (2.88) |
| 7 | 12,200 (854.0) | 1,646.2 (115.23) | 2.4 (13.05) | 0.53 (2.88) |

[1] ASTM-D-638-72
[2] ASTM-D-790-71
[3] ASTM-D-256-72a

TABLE IV

Electrical Properties

| Property | Arc Resistance | Dielectric Constant[1] 1.0 KHZ | Dielectric Constant[1] 1 MHZ | Dielectric Constant after 7 days Water Immersion 1.0 KHZ | Dielectric Constant after 7 days Water Immersion 1 MHZ | Volume Resistivity[2] (2 units) Immediate | Volume Resistivity[2] (2 units) After 7 days Immersion |
|---|---|---|---|---|---|---|---|
| Sample 1 | 195 | 4.6 | 4.2 | 6.1 | 4.9 | $3 \times 10^{15}$ | $2.8 \times 10^{12}$ |
| 2 | 191 | 4.4 | 4.2 | 5.5 | 4.7 | $2.4 \times 10^{15}$ | $9.7 \times 10^{13}$ |
| 3 | 193 | 4.5 | 4.3 | 5.6 | 4.7 | $1.9 \times 10^{15}$ | $1.9 \times 10^{14}$ |
| 4 | 187 | 4.5 | 4.2 | 5.3 | 4.6 | $3.7 \times 10^{15}$ | $7.6 \times 10^{14}$ |
| 5 | 193 | 4.4 | 4.2 | 5.0 | 4.4 | $4.8 \times 10^{15}$ | $8.4 \times 10^{14}$ |
| 6 | 193 | 4.6 | 4.2 | 5.4 | 4.7 | $2.5 \times 10^{15}$ | $2.8 \times 10^{14}$ |
| 7 | 188 | 4.4 | 4.1 | 5.0 | 4.5 | $3.4 \times 10^{15}$ | $1.2 \times 10^{15}$ |

[1] ASTM-D-150-70
[2] ASTM-D-257-66

From the results in Table III it can be concluded that the addition of the silanes did not materially affect the physical properties of the samples.

The tests of electrical properties in Table IV reveal that all samples had good arc resistance. The dielectric constants of the samples were of the same order of magnitude for all samples but after 7 day-immersion in water, dielectric constants of silane containing samples were about 10–20% lower than that of the control sample. Volume resistivity of the control after immersion was poorer by a factor of 1000 ($10^3$) whereas the silane treated samples showed comparatively little change.

TABLE V

Coefficient of Linear Thermal Expansion

| Property | Temperature range: −30 to +30° C. | +70° C. | +125° C. | +140° C. | +225° C. |
|---|---|---|---|---|---|
| | All values × 10⁶/degree C. | | | | |
| Sample 1 | 20.7 | 21.8 | 13.4 | 23.8 | 42.7 |
| 2 | 20.1 | 18.2 | 22.4 | 21.6 | 32.3 |
| 3 | 16.8 | 14.9 | 17.5 | 17.5 | 17.4 |
| 4 | 19.4 | erratic | 10.7 | 16.9 | 39.6 |
| 5 | 17.1 | 17.1 | 17.4 | 17.4 | 16.9 |
| 6 | 16.9 | 9.9 | 15.6 | 17.8 | 22.2 |
| 7 | 23.7 | 19.2 | 31.3 | 28.3 | 58.9 |

The results indicate that silanes contained in samples 3, 5 and 6 cause a significantly lower coefficient of thermal linear expansion. Silanes in samples 3 and 5 resulted in stabilizing the coefficient of thermal linear expansion over the temperature range of the tests.

Only the silane in sample 7 resulted in increasing the coefficient above that of the control sample (sample 1). The effect on the coefficient of linear expansion was totally unexpected and no explanation for this effect is offered.

EXAMPLE IV

A blend of the following ingredients and specified concentrations was produced by mixing in a blender with subsequent extrusion:

| INGREDIENTS | WEIGHT PERCENT |
|---|---|
| partially cured poly(phenylene sulfide) | 35 |
| talc | 28.9 |
| lithium carbonate | 1.0 |
| fiberglass fibers | 35 |
| zinc stearate | 0.1 |

The blend was tested according to ASTM standards and the following results recorded:

TABLE VI

| PHYSICAL PROPERTIES | UNIT | TEST |
|---|---|---|
| Tensile Strength | 10,000 PSI 68.9 MPa | ASTM-D-638-72 |
| Flexural modules | $1.8 \times 10^6$ PSI 12,400 MPa | ASTM-D-790-71 |
| Izod impact, notched | 0.7 ft lbs/in 37 J/M | ASTM-D-256-72A |
| Izod impact, unnotched | 1.7 ft lbs/in 91 J/M | ASTM-D-256-72A |
| Arc resistance | 180 sec. | ASTM-D-495 |

The data above show that this composition is suitable as an arc resistant poly(phenylene sulfide) composition.

I claim:
1. An arc resistant composition which comprises:
   a poly(arylene sulfide);
   about 20 to about 50 weight percent of the total composition of at least one additive chosen from among clay and talc; and
   about 1 to about 5 percent by weight of the total composition of lithium carbonate.

2. An arc resistant composition as claimed in claim 1 which also comprises glass in an amount of about 20 to about 35 percent by weight of the total composition.

3. An arc resistant composition of claim 2 wherein poly(arylene sulfide) is poly(phenylene sulfide).

4. An arc resistant composition which comprises:
a poly(arylene sulfide);
about 20 to about 50 weight percent of the total composition of at least one additive chosen from clay and talc; and
about 0.5 to about 5 percent by weight of the total composition of silanes chosen from among the group consisting of alkylsilanes, alkyloxysilanes, and polymers thereof.

5. An arc resistant composition as claimed in claim 4 wherein said silanes are selected from the group consisting of:
γ-glycidoxypropyltrimethoxysilane,
methyltrimethoxysilane, and
polyisoxymethoxysilane.

6. An arc resistant composition wherein poly(phenylene sulfide) comprises about 45 weight percent of the total composition and clay, talc, and glass comprise about 17.5, 17.5, and 20 weight percent of the total composition, respectively.

7. An arc resistant composition as claimed in claim 6 further comprising about 0.5 to about 1 weight percent of silanes selected from the group consisting of:
γ-glycidoxypropyltrimethoxysilane,
methyltrimethoxysilane, and
polyisoxymethoxysilane.

8. An arc resistant composition as claimed in claim 3 wherein said poly(phenylene sulfide) comprises about 35 weight percent of the total composition, talc is about 28.9 weight percent of the total composition, glass is about 35 weight percent of the total composition, lithium carbonate is about 1.0 weight percent of the total composition, and further comprising zinc stearate in an amount of about 0.1 weight percent of the total composition.

9. A process for producing an arc resistant composition which comprises
(a) blending uncured or partially cured poly(arylene sulfide) with (1) about 20 to about 50 percent by weight of the total composition of at least one additive chosen from among clay and talc and (2) about 0.5 to about 5 percent by weight of silanes selected from the group consisting of alkylsilanes, alkyloxysilanes, and polymers thereof, and
(b) subjecting the blend to curing conditions.

10. A method of claim 9 wherein said silanes are selected from the group consisting of:
γ-glycidoxypropyltrimethoxysilane,
methyltrimethoxysilane, and
polyisoxymethoxysilane.

11. A process for producing an arc resistant composition which comprises
(a) blending uncured or partially cured poly(arylene sulfide) with (1) about 20 to about 50 percent by weight of the total composition of at least one additive chosen from among clay and talc and (2) about 1 to about 5 percent by weight of the total composition of lithium carbonate, and
(b) subjecting the blend to curing conditions.

12. A method of claim 11 wherein glass in an amount of about 20 to about 35 percent by weight of the total composition is also blended with uncured or partially cured poly(arylene sulfide).

13. A method of claim 12 where the poly(arylene sulfide) is poly(phenylene sulfide).

14. A method of claim 13 wherein the poly(phenylene sulfide) comprises about 35 weight percent of the total composition, talc is about 28.9 weight percent of the total composition, glass is about 35 weight percent of the total composition, lithium carbonate is 1.0 weight percent of the total composition, and further comprising zinc stearate in an amount of about 0.1 weight percent of the total composition.

15. A process for producing an arc resistant composition which comprises blending uncured or partially cured poly(phenylene sulfide) in amount of about 45 weight percent of the total composition and clay, talc, and glass in an amounts of about 17.5, 17.5, and 20 weight percent of the total composition, respectively and subjecting the blend to curing conditions.

16. A method of claim 15 wherein said composition further comprises about 0.5 to about 1 weight percent of silanes selected from the group consisting of:
γ-glycidoxypropyltrimethoxysilane,
methyltrimethoxysilane, and
polyisoxymethoxysilane.

17. A product formed by the process of claim 11.
18. A product formed by the process of claim 9.
19. A product formed by the process of claim 14.
20. A product formed by the process of claim 15.

* * * * *